United States Patent [19]
Raillere et al.

[11] 3,807,863
[45] Apr. 30, 1974

[54] METHOD AND APPARATUS FOR TESTING FOR PHOSPHOR PARTICLES CONTAINED IN THE ATMOSPHERE

[75] Inventors: Raymond Raillere; Georges Edouard Fulachier, both of Vert le Petit, France

[73] Assignee: Etat Francais, Paris, France

[22] Filed: July 6, 1972

[21] Appl. No.: 269,404

[30] Foreign Application Priority Data
July 22, 1971    France .............................. 71.26793

[52] U.S. Cl.................... 356/87, 356/187, 431/4, 431/126
[51] Int. Cl. ............................................. G01j 3/30
[58] Field of Search ........... 356/87, 187; 431/126, 4

[56] References Cited
UNITED STATES PATENTS
3,213,747  10/1965  van der Smissen ............... 356/87 X
3,486,827  12/1969  Binek et al ........................ 356/87 X
3,644,743  2/1972  Binek et al ........................ 356/87 X Primary Examiner—Ronald L. Wibert
Assistant Examiner—F. L. Evans
Attorney, Agent, or Firm—Waters, Roditi, Schwartz & Nissen

[57] ABSTRACT

A method and apparatus for detecting phosphor products contained in the atmosphere in which a negative pressure is produced within an enclosure and is utilized to feed ambient air to a primary burner mounted in the enclosure. Hydrogen is also supplied to the primary burner in excess of the stoichiometric amount for conversion of the oxygen in the air to water and the hydrogen is burned to produce a flame. A secondary burner surrounds the first burner for burning hydrogen excess contained in the exhaust gases from the primary burner. The flame of the primary burner is optically analyzed to detect the magnitude of phosphor products in the ambient air supplied to the primary burner.

12 Claims, 2 Drawing Figures

METHOD AND APPARATUS FOR TESTING FOR PHOSPHOR PARTICLES CONTAINED IN THE ATMOSPHERE

BACKGROUND

1. Field of the Invention

The present invention relates to a method and apparatus for the detection of phosphor by-products contained in an atmosphere.

2. Prior Art

Numerous phosper by-products have been found to be very toxic. Therefore, industries in which such by-products are produced must employ means for permanently detecting, anywhere and in a very dependable manner, the existence of by-products of this type in the atmosphere. Available phosphor detectors have not proven fully reliable and satisfactory.

SUMMARY OF THE INVENTION

An object of the invention is to provide a phosphor detector which is very reliable, highly sensitive, preferably self-contained and portable. The detector allows for either continuous or discontinuous detection and can be easily associated with a suitable alarm device, either external or a part of the apparatus.

The apparatus utilizes a process, whose principle is known, i.e., flame emission. Within the scope of this process, however, the following specific features have been selected:

use of phosphor emission at a 526 m$\mu$ wave length by the implementation of a double flame device.

as a primary burner, the use of relative quantities of oxygen and hydrogen which result in a richer hydrogen mixture compared to the stoichiometric quantities required for the production of water.

The apparatus, according to this invention, comprises:

a primary hydrogen flame burner including a center hot air inlet connected with the atmosphere to be tested, and a controlled hydrogen annular inlet. The air is sucked into the apparatus due to the pressure of a controlled suction which is maintained within said apparatus by an adjustable flow fan and a capillary tube which causes a pressure drop in the air inlet. The air is heated by conveying it through a pipe incorporated in the body of the apparatus and by circulating the air over a suitably heated filter. The hydrogen is supplied from a pressurized cylinder and a fine adjustment of the hydrogen flow is obtained by the utilization of a capillary tube fitted in the gas line.

a second burner, mounted directly above the first, is used for burning the excess hydrogen contained in the exhaust gases delivered by the primary burner flame. For this purpose, the second burner directly opens into a chamber which is fed with combustion gas from the primary burner gases, on the one hand, and with combustion air through openings provided in the body of the apparatus, and through which the ambient air is admitted as a result of the suction existing within the body of the apparatus, An adjustable flow fan providing a suitable and controllable negative pressure or suction in the body of the apparatus, means for ensuring gas ignition in the burners, and a device for analyzing the light radiation of the primary burner flame. This device essentially consists of a heat resisting glass window located in the body of the apparatus at the level of the flame, an interference filter tuned to a 526 $\mu$ wave length and a photomultiplier or other suitable device for converting the light signal into an electrical signal.

The apparatus, according to this invention, may also be supplemented with the following additional elements:

a measuring device or amplifier-recorder for the measurement of the phosphor by-product concentrations to be detected, a conventional alarm device adapted to be actuated by the presence of an electrical signal of pre-determined magnitude from the photomultiplier, an alarm correction or cancellation device which may, for instance, include a second photomultiplier, connected with the same burner, but receiving the light signal through an interference filter tuned to a wave length such that:

it corresponds to a pre-visible spurious radiation it refers to another emission of the phosphor to be used as a confirmation, e.g., 560 $\mu$.

The invention also relates to a method which is characterized in that the analysis is effected in a double flame burner and the primary burner is supplied with hydrogen and ambient air in a mixture whose relative proportion of hydrogen is greater than that corresponding to the stoichiometric production of water.

DETAILED DESCRIPTION

Figure 1:
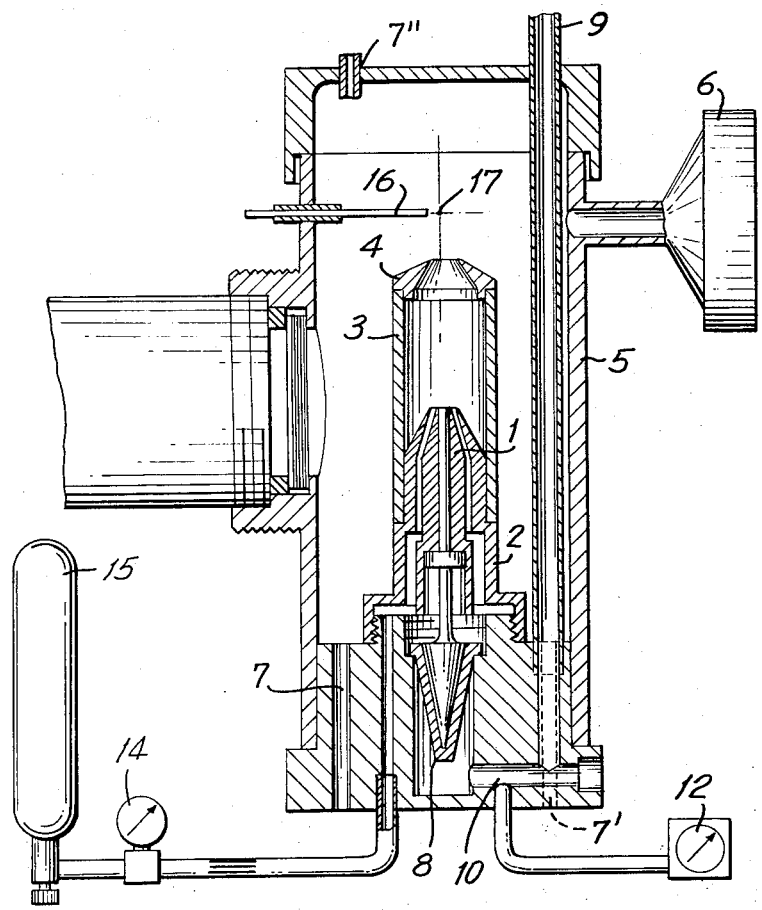
FIG. 1 is a cross-sectional view of the apparatus and the burners.

Referring in detail to FIG. 1, the apparatus comprises two concentric nozzles, i.e., an inner nozzle 1 having an inlet for ambient air to be examined for the presence of phosphor particles therein, and an outer nozzle 2. The nozzles 1 and 2 are mounted within an enclosure formed by a rigid metal body 5.

Hydrogen is introduced through an annular space between nozzles 1 and 2. The nozzles are covered with a glass tube 3 on which is mounted a third nozzle for burning excess hydrogen. Ambient air is sucked into the nozzle by the development of a negative pressure within body 5 under the action of an adjustable flow fan 6. As a result of this negative pressure or suction, a certain quantity of auxiliary air is introduced through various openings, 7, 7′ and 7″ located in the burner body. This air is required for burning the excess hydrogen.

The air entering the nozzle 1 flows through metal filter 8 which is heated by thermal conductivity of the nozzle support block of body 5. Th air itself is preheated after circulating in air inlet tube 9 provided inside the burner body.

This arrangement makes it possible to retain the solid particles normally contained in the air, these being liable to generate a spurious emission, caused for example by the emission of very bright sodium lines or by incandescence upon passage through the flame. On the other hand, the heating allows recovery in vapor form of the phosphor products of means volatility whose detection is desired.

A capillary tube 10 allows the differential pressure between the inside and outside of the body to be increased, thus facilitating the measurement and adjustment of the air flow across the nozzle through simple indication of the suction upstream of the capillary by means of pressure conduit 11 and pressure gauge 12.

The establishment of the hydrogen flow is performed by measuring the inlet pressure. This measurement can take place by inserting a second capillary tube 13 into the body. A pressure gauge 14 installed between the pressure reducing valve of a supply cylinder 15 and the capillary tube allows this flow to be measured after calibration.

In the embodiment described, ignition is achieved at the flame level of nozzle 4 via a high-voltage spark generated either by a transformer or a coil similar to that of an automobile engine.

The spark is initiated between electrode 16 and tip 17 connected to ground.

In other embodiments, ignition may be effected by means of a wire placed over nozzle 4, the wire being made red hot by the passage of an electric current therethrough.

The burner body construction is such that it is substantially light impermeable although it incorporates large auxiliary air inlets.

Figure 2:
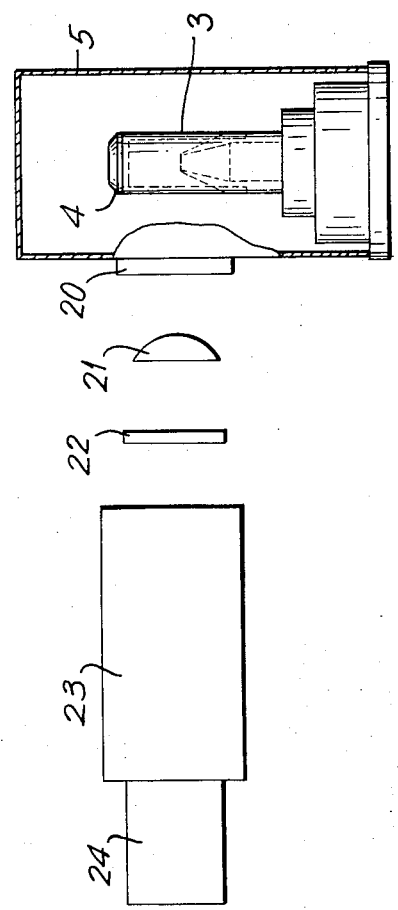
FIG. 2 is a schematic diagram of an optical-electrical device associated with the apparatus.

An optical receiver, schematically shown in FIG. 2, is placed at right angles to the flame axis at a distance of a few millimeters from the nozzle outlet.

The optical receiver comprises a heat resisting glass 20 to stop or to reflect infrared rays; a lens 21 having a focal length such that it receives the widest possible solid angle of aperture and transmits a substantially parallel beam; and interference filter 22 turned to the main emission wave length of the phosphor particles, i.e., 526 $\mu$; a photomultiplier 23 having 10 stages ad a photocathode diameter sufficient to pick-up the entire beam from lens 21 which is transmitted through filter 22; and a supply circuit 24 for the photomultiplier fed with high voltage from an inverter, the latter being supplied with low voltage from a primary battery or a storage battery. The usable signal is taken across the anode of the photomultiplier and the positive terminal connected to the HV-power supply ground. This signal is then transmitted either to a direct reading instrument or recorder, or to an amplifier controlling a visual or audio warning system.

The device described above has been used to determine the optimum operating conditions allowing the highest sensitivity to be obtained.

As a result it has been found that the maximum signal is obtained when the hydrogen and air proportions correspond to the theoretical quantities for producing $H_2O$. In this case, however, the usable signal-to-flame lower ratio is far from reaching its maximum value. To attain the latter, it is necessary to decrease the air flow so as not to exceed the optimum value which is dependent upon the size of the inlet nozzle.

As a reference, not to be considered as limitative, it has been found that with a 2 mm dia. air inlet nozzle, the air flow affording the highest signal-to-flame bottom ratio ranges approximately from 60 to 70 cm$^3$/minute.

This ratio shows a very large drop on either side of this value.

On the other hand, the hydrogen flow does not entail any noticeable effect, provided however that it is at least higher than that corresponding to the production of $H_2O$.

Consequently, particular care must be taken to ensure a constant air flow, after its setting, either by using a high precision fan or by incorporating a flow regulator such as a metering orifice in the supply conduit.

Finally, it is important that the auxiliary air inlets 7 7' and 7'' be affected as little as possible by environmental conditions (e.g., wind).

To this end, the location of these air inlets is widely diversified, each being separately protected against direct external effects. Furthermore, to minimize the latter, the amount of air flowing through these inlets must be much higher (e.g., 20 to 50 times) than that flowing through the nozzle.

In some cases, it may be advantageous to bleed the air from the nozzle by means of a pick-off provided in the large airflow of one of these auxiliary inlets.

As the system operates on the exhaust mode, the flows at each inlet are easily adjustable using a single fan, thus precluding the risk of modifying the concentration after the passage in the moving elements of a pump.

The method described allws the following performance to be achieved:

if the test seeks indication of the concentration in the absence of contaminating agents other than the product to be detected, i.e., if the sole background noise limiting the sensitivity results from flame fluctuations and from photomultiplier background noise, the $PH_3$ product (or phosphor compound equivalent) can be detected with a concentration of 0.5 ppb (parts per billion).

if the test aims at a detection in the presence of certain contaminating agents differing from the phosphor products, the $PH_3$ product (or phosphor compound eqivalent) can be detected with a correct specificity using a concentration of 20 ppb (parts per billion).

The apparatus can be easily carried and therefore is portable as the required power supplies can be delivered by a primary battery or a storage battery. By way of reference, a 24-V battery, with a current draw of 1 A, has been used for supplying the various components as follows:

| | |
|---|---|
| Exhaust fan | 0.2 A |
| HV-inverter | 0.1 A |
| Spark ignition | 0.2 A |
| Amplifier or recorder | 0.3 A |
| Total | 0.8 A |

What is claimed is:

1. Apparatus for detecting phosphor products contained in the atmosphere, said apparatus comprising
a rigid body defining an enclosure,
means for producing a negative pessure within said enclosure,
a primary burner means mounted in said enclosure,
means for supplying hydrogen to said primary burner means,
means for supplying ambient air directly to said primary burner means under the action of the negative pressure in said enclosure,
a secondary burner means surrounding said primary burner means for receiving and burning hydrogen excess contained in the exhaust gases from said primary burner means, means for supplying to said secondary burner means ambient air introduced into said enclosure under the section of the negative pressure therein independently of the air which is fed to the primary burner means, means for igniting the gases in the burner means, and means for optically analyzing the flame of the primary burner means to detect the magnitude of the phosphor products in the ambient air supplied to the primary burner means.

2. Apparatus as claimed in claim 1 wherein said means for supplying hydrogen to said primary burner means comprises means for regulating the supply of hydrogen so that is is in excess of the amount which would be necessary to produce water with the oxygen in the air supplied to the primary burner means.

3. Apparatus as claimed in claim 1 wherein said body has inlets for supply of air to said secondary burner means under the action of the negative pressure in said enclosure.

4. Apparatus as claimed in claim 1 wherein said primary burner means comprises first and second nozzles and said secondary burner means comprises a third nozzle on and coaxial with said first and second nozzles.

5. Apparatus as claimed in claim 4 wherein said first and second nozzles define an annular passageway through which hydrogen gas is passed, said first nozzle having an axial duct with an inlet for flow of ambient air therethrough.

6. Apparatus as claimed in claim 5 comprising means for heating the ambient air within said body before the air is fed to the inlet of the first nozzle.

7. Apparatus as claimed in claim 1 wherein said means for optically analyzing the flame comprises an interference filter facing said primary burner means to be exposed to the flame produced thereby and pass light of a selected wave length, and means for receiving the light passed by the interference filter to indicate the intensity of such light.

8. Apparatus as claimed in claim 7 wherein the means for receiving the light comprises a photomultiplier for converting the light energy into electrical energy.

9. A method for detecting phosphor products contained in the atmosphere, said method comprising forming an enclosure, producing a negative pressure within said enclosure, supplying hydrogen to a first burner in said enclosure, supplying ambient air directly to said first burner under the action of the negative pressure in said enclosure, regulating the supply of hydrogen to the first burner so that it is in excess of the amount which would be necessary to produce water with the oxygen in the air supplied to the first burner, burning the hydrogen in the first burner to produce a flame, burning, in a second burner in the enclosure, excess hydrogen contained in the exhaust gases from said first burner, supplying air to said second burner under the action of the negative pressure in said enclosure and independently of the air supplied to the first burner, and optically analyzing the flame produced in the first burner to detect the magnitude of phosphor products in the ambient air supplied to the first burner.

10. A method as claimed in claim 9 comprising heating the ambient air within said enclosure before the air is fed to the inlet of the first burner.

11. A method as claimed in claim 9 wherein said flame is optically analyzed by an interference filtering of the light of said flame to pass light energy of a selected wave length, receiving the light energy which is passed, and indicating the intensity of such light energy.

12. A method as claimed in claim 11 comprising converting the light energy to electrical energy, the magnitude of the latter being a measure of the intensity of the light energy.

* * * * *